United States Patent
Yamada

(10) Patent No.: US 8,842,505 B2
(45) Date of Patent: Sep. 23, 2014

(54) MAGNETIC DISK DEVICE AND METHOD OF CONTROLLING MAGNETIC HEAD

(71) Applicant: Kabushiki Kaisha Toshiba, Tokyo (JP)

(72) Inventor: Yuuichi Yamada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/804,894

(22) Filed: Mar. 14, 2013

(65) Prior Publication Data
US 2014/0160906 A1    Jun. 12, 2014

(30) Foreign Application Priority Data

Dec. 12, 2012 (JP) ................................. 2012-271658

(51) Int. Cl.
    *G11B 11/00*        (2006.01)
    *G11B 11/105*      (2006.01)

(52) U.S. Cl.
    CPC ................................. *G11B 11/10552* (2013.01)
    USPC ..... 369/13.33; 360/59; 360/245.8; 360/264.2

(58) Field of Classification Search
None
See application file for complete search history.

(56) References Cited

U.S. PATENT DOCUMENTS

| 8,018,688 | B2 * | 9/2011 | Kamigama et al. | 360/266 |
| 2008/0055771 | A1 | 3/2008 | Suzuki | |
| 2012/0099221 | A1 * | 4/2012 | Ho et al. | 360/75 |
| 2012/0134047 | A1 | 5/2012 | Kikuchi et al. | |

FOREIGN PATENT DOCUMENTS

| JP | 2008-059663 | 3/2008 |
| JP | 2012-119031 | 6/2012 |

* cited by examiner

*Primary Examiner* — Brenda Bernardi
(74) *Attorney, Agent, or Firm* — Knobbe Martens Olson & Bear LLP

(57) ABSTRACT

According to one embodiment, a first magnetic head is used to record or reproduce data on or from the first disk surface and includes a first two-terminal element including a first positive terminal and a first negative terminal. A second magnetic head is used to record or reproduce data on or from the second disk surface and includes a second two-terminal element including a second positive terminal and a second negative terminal. A current control unit includes a first current terminal which is commonly connected to the first positive terminal and the second negative terminal and a second current terminal that is commonly connected to the first negative terminal and the second positive terminal and can switch a current polarity between the first current terminal and the second current terminal.

12 Claims, 13 Drawing Sheets

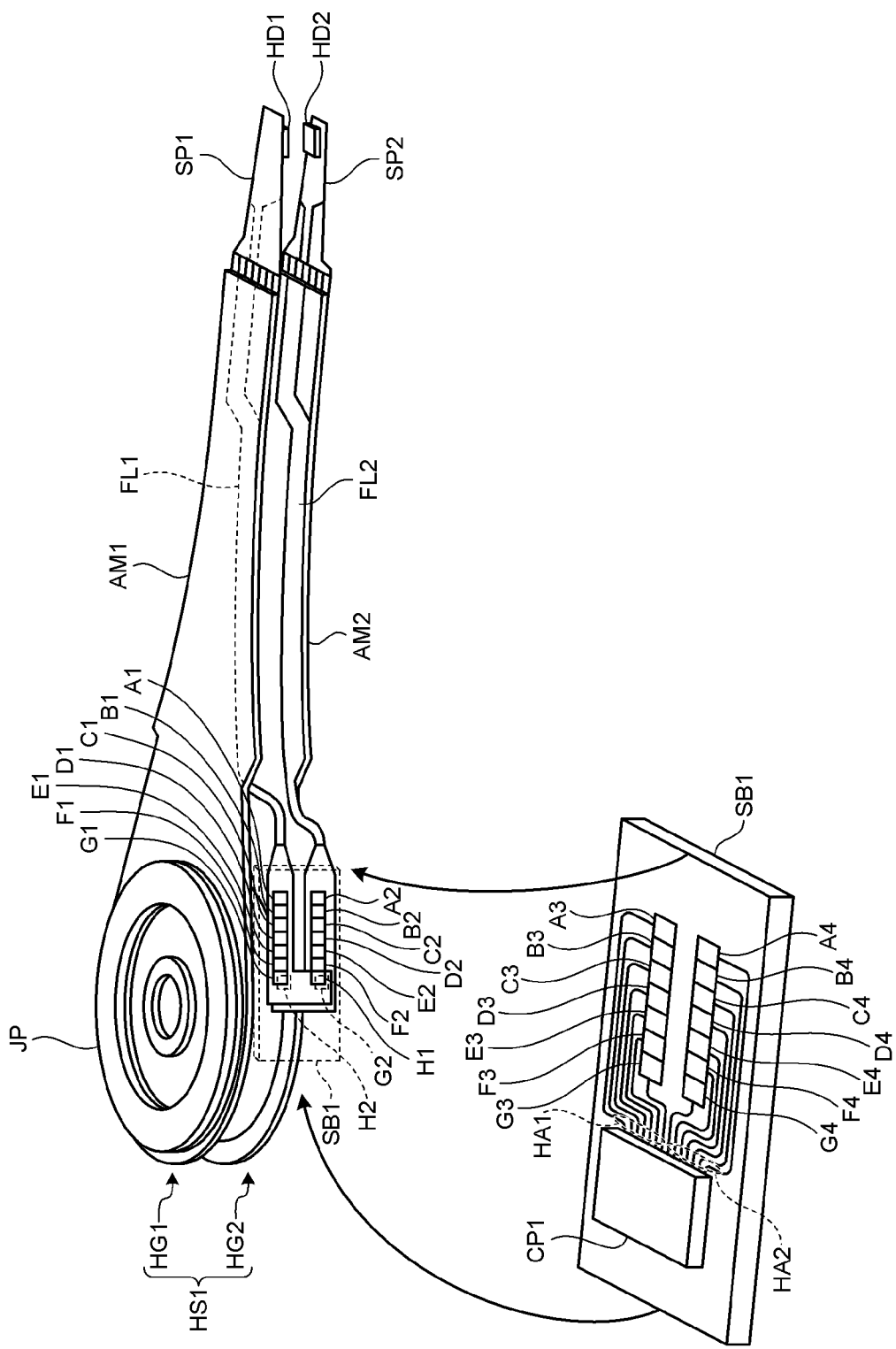

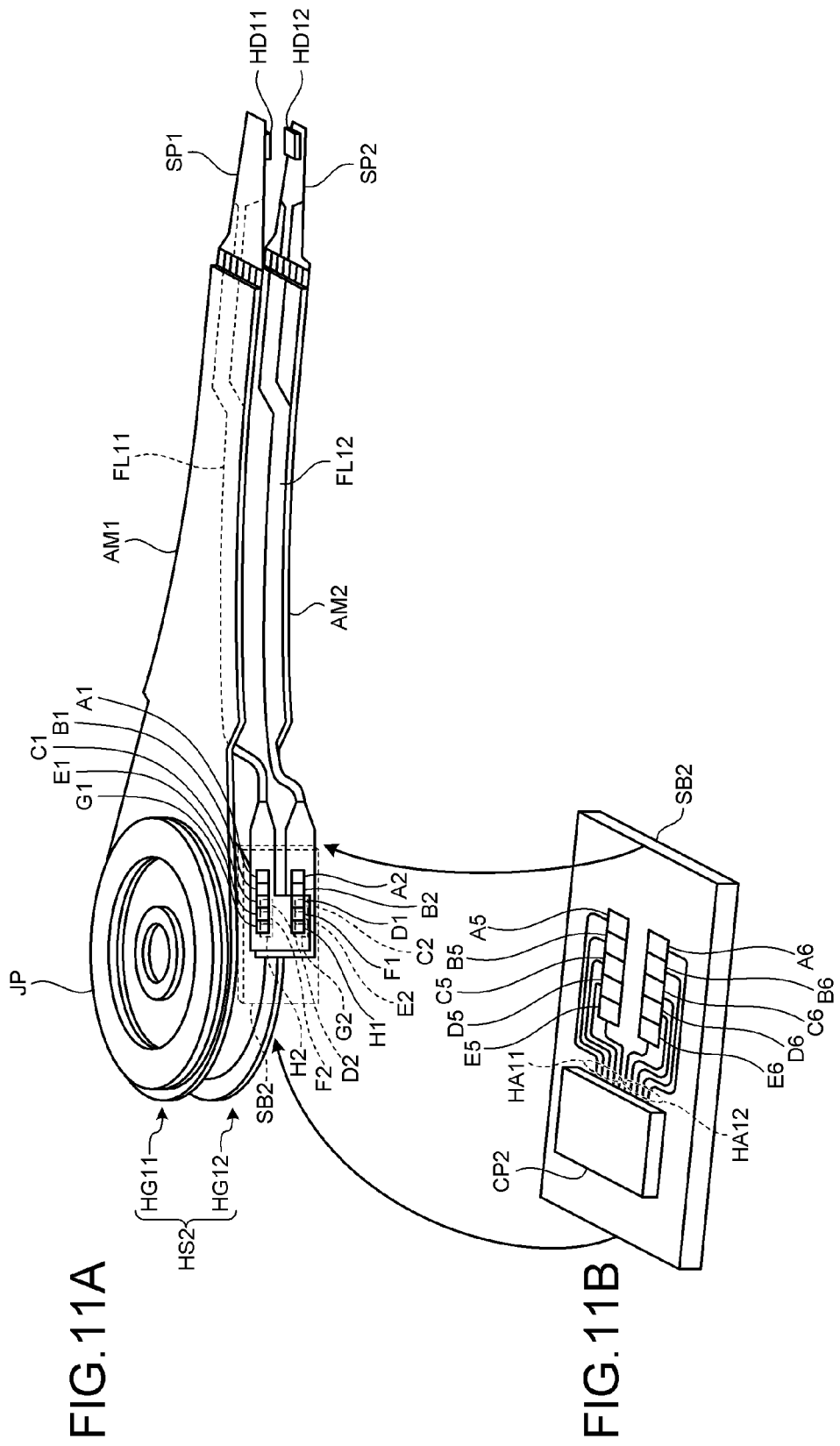

MAGNETIC DISK DEVICE AND METHOD OF CONTROLLING MAGNETIC HEAD

CROSS-REFERENCE TO RELATED APPLICATIONS

This application is based upon and claims the benefit of priority from Japanese Patent Application No. 2012-271658, filed on Dec. 12, 2012; the entire contents of which are incorporated herein by reference.

FIELD

Embodiments of the invention relate to a magnetic disk device and a method of controlling a magnetic head.

BACKGROUND

In a magnetic disk device with a plurality of disk surfaces, a head stack assembly (HSA) which holds a plurality of magnetic heads is provided so as to correspond to each disk surface. The magnetic head includes a plurality of elements, such as a reading element, a writing element, a heater element, an element for assisted recording. When the number of elements provided in each magnetic head increases, the space of the bonding portions of wiring lines connected to the elements increases. As a result, the structure of the head stack assembly becomes complicated and the size thereof increases.

BRIEF DESCRIPTION OF THE DRAWINGS

FIG. 3A is a perspective view illustrating the schematic structure of a head stack assembly HS1 including magnetic heads HD1 and HD2 illustrated in FIG. 1;

FIG. 3B is a perspective view illustrating the schematic structure of a circuit board provided in the head stack assembly HS1 illustrated in FIG. 3A;

FIG. 11A is a perspective view illustrating the schematic structure of a head stack assembly HS2 including magnetic heads HD11 and HD12 illustrated in FIG. 10;

FIG. 11B is a perspective view illustrating the schematic structure of a circuit board provided in the head stack assembly HS2 illustrated in FIG. 11A;

DETAILED DESCRIPTION

According to one embodiment, a magnetic disk device includes a magnetic disk, a first magnetic head, a second magnetic head, and a current control unit. The magnetic disk includes a first disk surface and a second disk surface. The first magnetic head is used to record or reproduce data on or from the first disk surface and includes a first two-terminal element including a first positive terminal and a first negative terminal. The second magnetic head is used to record or reproduce data on or from the second disk surface and includes a second two-terminal element including a second positive terminal and a second negative terminal. The current control unit includes a first current terminal which is commonly connected to the first positive terminal and the second negative terminal and a second current terminal that is commonly connected to the first negative terminal and the second positive terminal and can switch a current polarity between the first current terminal and the second current terminal.

Hereinafter, magnetic disk devices according to embodiments of the invention will be described in detail with reference to the accompanying drawings. The invention is not limited by the embodiments.

(First Embodiment)

Figure 1:
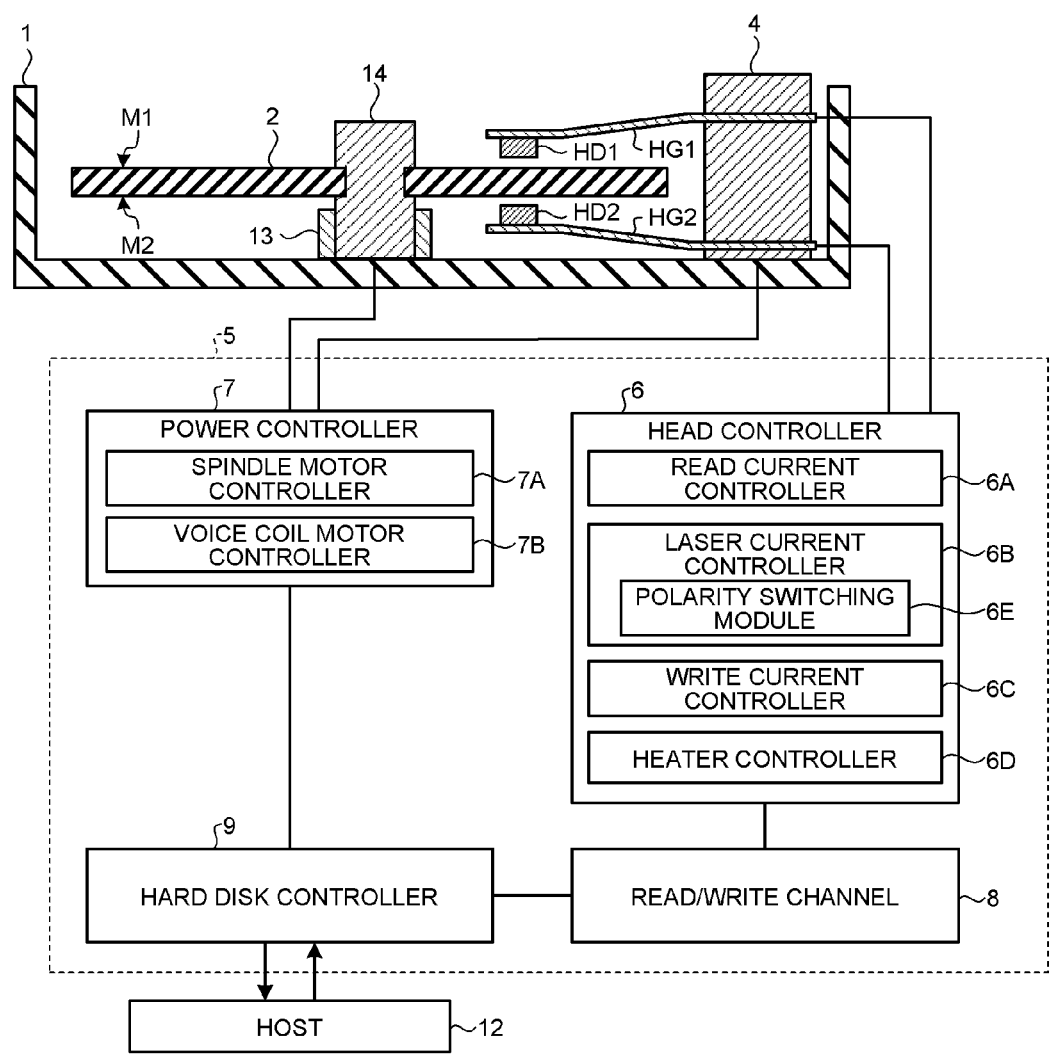
FIG. 1 is a block diagram illustrating the schematic structure of a magnetic disk device according to a first embodiment.

FIG. 1 is a block diagram illustrating schematic structure of a magnetic disk device according to a first embodiment.

In FIG. 1, the magnetic disk device includes a magnetic disk 2 and the magnetic disk 2 includes disk surfaces M1 and M2 each having a magnetic recording layer formed thereon.

The magnetic disk 2 is supported by a spindle 14. In addition, the magnetic disk device includes magnetic heads HD1 and HD2 which are used to perform recording or reproduction on the disk surfaces M1 and M2, respectively. The magnetic heads HD1 and HD2 are held by head gimbal assemblies HG1 and HG2 so as to face the disk surfaces M1 and M2, respectively.

The magnetic disk device includes a voice coil motor 4 that drives the head gimbal assemblies HG1 and HG2 and a spindle motor 13 that rotates the magnetic disk 2 through the spindle 14. The magnetic disk 2, the magnetic heads HD1 and HD2, the head gimbal assemblies HG1 and HG2, the voice coil motor 4, the spindle motor 13, and the spindle 14 are accommodated in a case 1.

Figure 2:
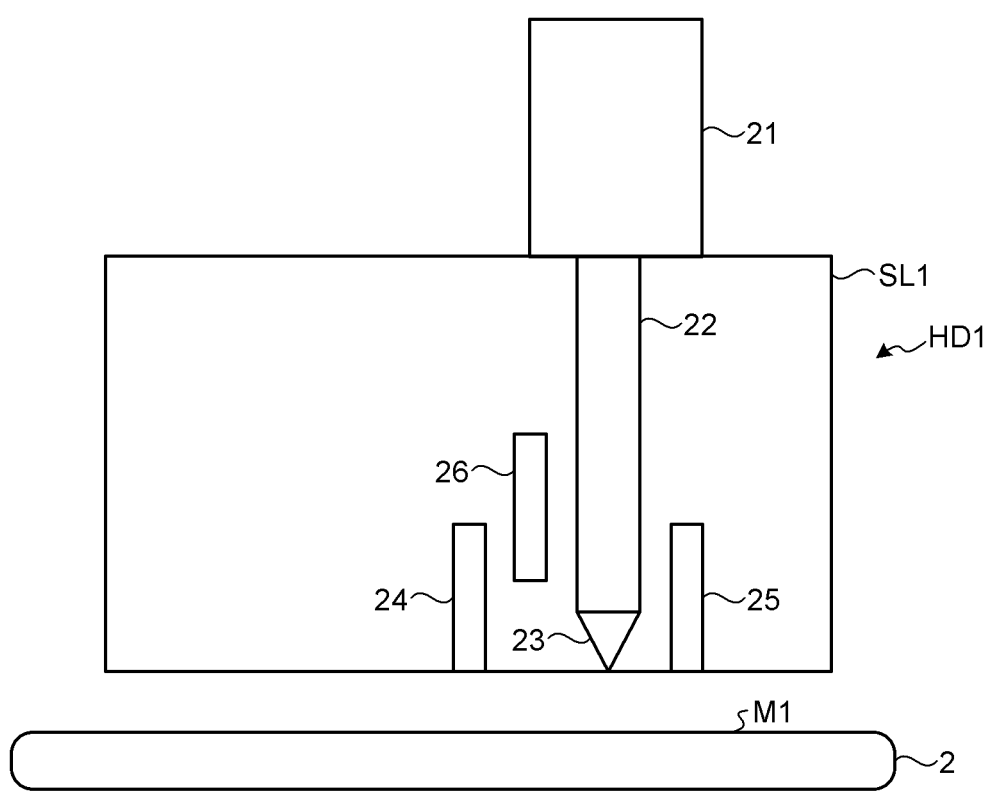
FIG. 2 is a block diagram illustrating the schematic structure of a magnetic head HD1 illustrated in FIG. 1.

FIG. 2 is a block diagram illustrating the schematic structure of the magnetic head HD1 illustrated in FIG. 1.

In FIG. 2, the magnetic head HD1 includes a laser diode 21, an optical waveguide 22, a near-field light element 23, a reading element 24, a writing element 25, and a heater element 26 and is supported on a slider SL1. The near-field light element 23, the reading element 24, and the writing element 25 are arranged so as to face the disk surface M1. Laser light emitted from the laser diode 21 is transmitted to the near-field light element 23 through the optical waveguide 22. The near-field light element 23 generates near-field light and emits the near-field light to the disk surface M1 such that the disk surface M1 is locally heated. The magnetic field generated by the writing element 25 is applied to a region which is heated by the near-field light. Then, the magnetization state of the region is changed and so-called thermally-assisted magnetic recording is performed. At that time, the slider SL1 is heated by the heater element 26 and the expansion of the slider SL1 is controlled to control the distance between the slider SL1 and the disk surface M1. The magnetic head HD2 may have the same structure as the magnetic head HD1.

Figure 4A:
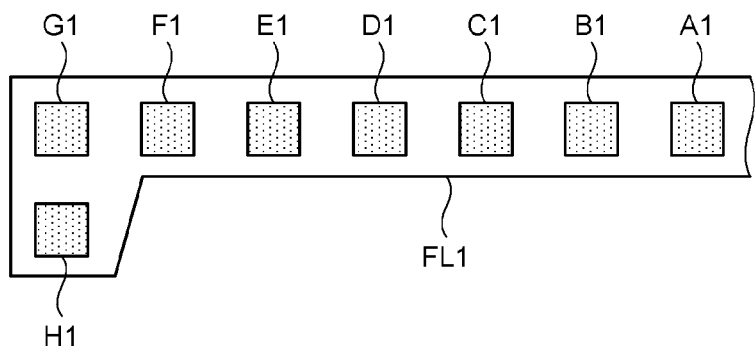
FIG. 4A is a plan view illustrating the structure of a terminal portion of a flexure FL1 illustrated in FIG. 3A.
Figure 4B:
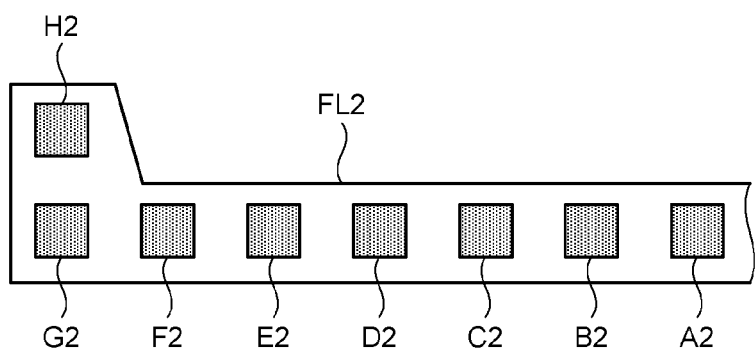
FIG. 4B is a plan view illustrating the structure of a terminal portion of a flexure FL2 illustrated in FIG. 3A.
Figure 4C:
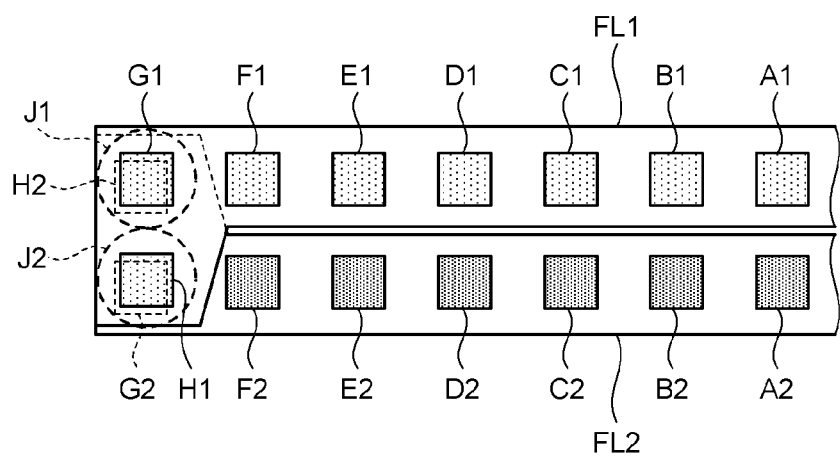
FIG. 4C is a plan view illustrating a method of mounting the terminal portions of the flexures FL1 and FL2 illustrated in FIGS. 4A and 4B.

FIG. 3A is a perspective view illustrating the schematic structure of a head stack assembly HS1 provided with the magnetic heads HD1 and HD2 illustrated in FIG. 1. FIG. 3B is a perspective view illustrating the schematic structure of a circuit board provided in the head stack assembly HS1 illustrated in FIG. 3A. FIG. 4A is a plan view illustrating the structure of a terminal portion of a flexure FL1 illustrated in FIG. 3A. FIG. 4B is a plan view illustrating the structure of a terminal portion of a flexure FL2 illustrated in FIG. 3A. FIG. 4C is a plan view illustrating a method of mounting the terminal portions of the flexures FL1 and FL2 illustrated in FIGS. 4A and 4B.

In FIG. 3A, suspensions SP1 and SP2 are provided at the leading ends of the head gimbal assemblies HG1 and HG2 and the magnetic heads HD1 and HD2 are arranged at the leading ends of the suspensions SP1 and SP2, respectively. The suspensions SP1 and SP2 are made of, for example, stainless steel and give elastic force against the disk surfaces M1 and M2 to the magnetic heads HD1 and HD2, respectively. The suspensions SP1 and SP2 are supported by arms AM1 and AM2, respectively, and the arms AM1 and AM2 are supported by a bearing unit JP such that they can be rotated in the horizontal planes to the disk surfaces M1 and M2 of the magnetic disk 2. The head gimbal assemblies HG1 and HG2 are laminated to form the head stack assembly HS1.

The head gimbal assemblies HG1 and HG2 include the flexures FL1 and FL2 for drawing wiring lines connected to the magnetic heads HD1 and HD2. The leading ends of the flexures FL1 and FL2 are connected to the magnetic heads HD1 and HD2 and terminals A1 to H1 and terminals A2 to H2 are provided at the rear ends of the flexures FL1 and FL2, respectively.

The terminals A1 and B1 can be allocated to two terminals of the writing element 25 of the magnetic head HD1. The terminals C1 and D1 can be allocated to two terminals of the heater element 26 of the magnetic head HD1. The terminals E1 and F1 can be allocated to two terminals of the reading element 24 of the magnetic head HD1. The terminals G1 and H1 can be allocated to two terminals of the laser diode 21 of the magnetic head HD1. The terminals A2 and B2 can be allocated to two terminals of the writing element of the magnetic head HD2. The terminals C2 and D2 can be allocated to two terminals of the heater element of the magnetic head HD2. The terminals E2 and F2 can be allocated to two terminals of the reading element of the magnetic head HD2. The terminals G2 and H2 can be allocated to two terminals of the laser diode of the magnetic head HD2.

As illustrated in FIG. 4A, a region of the Flexure FL1 in which the terminal H1 is arranged is bent toward the flexure FL2 in an L-shape. The terminals A1 to G1 are arranged in a line on the flexure FL1 and the terminal H1 is arranged in the bent portion of the flexure FL1 so as to be adjacent to the terminal G1. As illustrated in FIG. 4B, a region of the flexure FL2 in which the terminal H2 is arranged is bent toward the flexure FL1 in an L-shape. The terminals A2 to G2 are arranged in a line on the flexure FL2 and the terminal H2 is arranged in the bent portion of the flexure FL2 so as to be adjacent to the terminal G2.

As illustrated in FIG. 3A, the flexures FL1 and FL2 are arranged along the opposite surfaces of the suspensions SP1 and SP2 and the opposite surfaces of the arms AM1 and AM2. The rear ends of the flexures FL1 and FL2 are bent by 90° so as to be arranged on the side surfaces of the head gimbal assemblies HG1 and HG2. In this structure, as illustrated in FIG. 4C, the terminals A1 to G1 and the terminals A2 to G2 are arranged in parallel to each other on the side surfaces of the head gimbal assemblies HG1 and HG2. In addition, the terminal G1 is arranged so as to overlap the terminal H2 and the terminal H1 is arranged so as to overlap the terminal G2. The terminals G1 and H2 are bonded to each other to form a bonding portion J1 and the terminals G2 and H1 are bonded to each other to form a bonding portion J2.

The terminals A3 to G3, the terminals A4 to G4, and wiring lines HA1 and HA2 are formed on the circuit board SB1. In addition, an IC chip CP1 is mounted on the circuit board SB1. The IC chip CP1 may be a bear chip or the package type of the IC chip CP1 may be a chip size package or a BGA (Ball Grid Array) package. The terminals A3 to G3 are connected to the IC chip CP1 through the wiring line HA1 and the terminals A4 to G4 are connected to the IC chip CP1 through the wiring line HA2.

The circuit board SB1 is mounted on the rear ends of the flexures FL1 and FL2. Then, the terminals A3 to F3 are bonded to the terminals A1 to F1, respectively, and the terminals A4 to F4 are bonded to the terminals A2 to F2, respectively. The terminal G3 is bonded to the bonding portion J1 and is electrically connected to the terminals G1 and H2. The terminal G4 is bonded to the bonding portion J2 and is electrically connected to the terminals G2 and H1.

The terminal G1 is arranged on the terminal H2 so as to overlap the terminal H2 and the terminal H1 is arranged on the terminal G2 so as to overlap the terminal G2. In this way, the spaces of the flexures FL1 and FL2 and the circuit board SB1 can be reduced by a value corresponding to the terminals H1 and H2. In addition, the terminals G1 and H2 are bonded to each other and the terminals G2 and H1 are bonded to each other. In this way, it is possible to reduce the number of terminals of the IC chip CP1 and thus reduce the size of the IC chip CP1.

As illustrated in FIG. 1, the magnetic disk device includes a magnetic recording control unit 5. The magnetic recording control unit 5 includes a head control unit 6, a power control unit 7, a read/write channel 8, and a hard disk control unit 9.

The head control unit 6 includes a read current control unit 6A, a laser current control unit 6B, a write current control unit 6C, and a heater control unit 6D. The laser current control unit 6B includes a polarity switching unit 6E. The power control unit 7 includes a spindle motor control unit 7A and a voice coil motor control unit 7B.

The head control unit 6 can amplify or detect a signal during recording or reproduction. The read current control unit 6A can control the read currents of the magnetic heads HD1 and HD2. For example, the read current control unit 6A controls a current flowing to the reading element 24 in the magnetic head HD1. The laser current control unit 6B can control the laser currents of the magnetic heads HD1 and HD2. For example, the laser current control unit 6B controls a current flowing to the laser diode 21 in the magnetic head HD1. The write current control unit 6C can control the write currents of the magnetic heads HD1 and HD2. For example, the write current control unit 6C controls a current flowing to the writing element 25 in the magnetic head HD1. The heater control unit 6D can control the heater currents of the magnetic heads HD1 and HD2. For example, the heater control unit 6D controls a current flowing to the heater element 26 in the magnetic head HD1. The polarity switching unit 6E can switch the polarity of the current output from the laser current control unit 6B.

The power control unit 7 can drive the voice coil motor 4 and the spindle motor 13. The spindle motor control unit 7A can control the rotation of the spindle motor 13. The voice coil motor control unit 7B can control the driving of the voice coil motor 4.

The read/write channel 8 transmits and receives data between the head control unit 6 and the hard disk control unit 9. Examples of the data may include read data, write data, and servo data. For example, the read/write channel 8 can convert the signal reproduced by the reading element 24 into a data format treated by the host 12, or convert the data output from the host 12 into a signal format recorded by the writing element 25. Examples of the format conversion may include DA conversion or encoding. That is, the read/write channel 8 can decode the signal reproduced by the reading element 24 or encode the data output from the host 12.

The hard disk control unit 9 can control recording and reproduction on the basis of instructions from the outside of the magnetic disk device or transmit and receive data between the outside and the read/write channel 8.

In the reading of information from the magnetic disk 2, a signal is read from the magnetic disk 2 through the reading element 24 while the magnetic disk 2 is being rotated by the spindle motor 14 and is detected by the head control unit 6. The signal detected by the head control unit 6 is converted into data by the read/write channel 8 and is then transmitted to the hard disk control unit 9. The hard disk control unit 9 performs tracking control for the magnetic head HD1 on the basis of a servo signal in the signal detected by the head control unit 6.

Figure 5A:
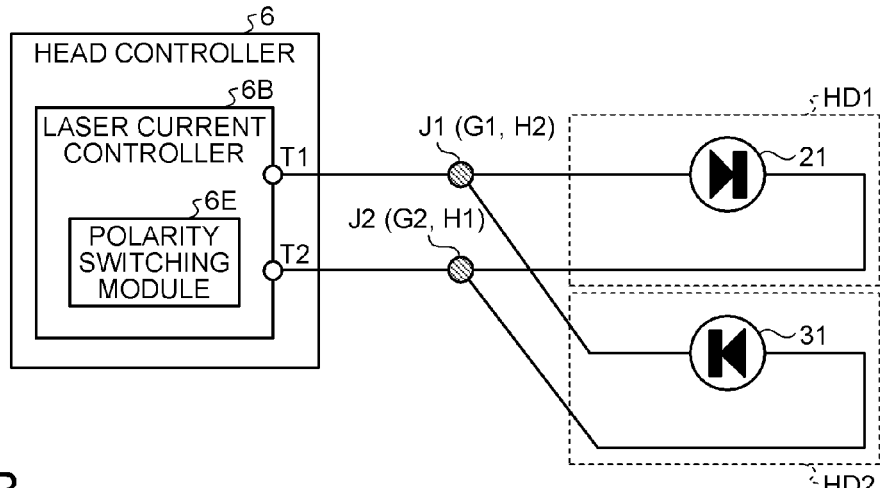
FIG. 5A is a diagram illustrating a method of connecting laser diodes 21 and 31 which are provided in the magnetic heads HD1 and HD2 illustrated in FIG. 1, respectively.
Figure 5B:
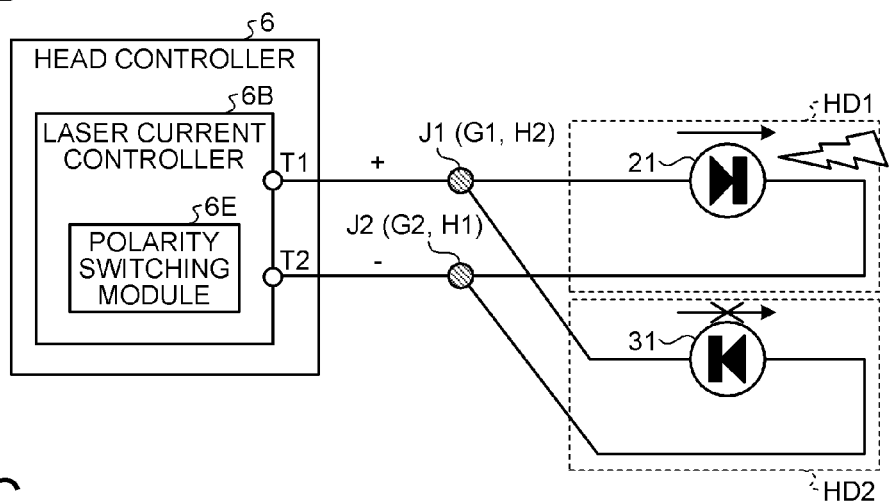
FIG. 5B is a diagram illustrating a polarity setting method of a laser current control unit 6B when the laser diode 21 illustrated in FIG. 5A is selected.
Figure 5C:
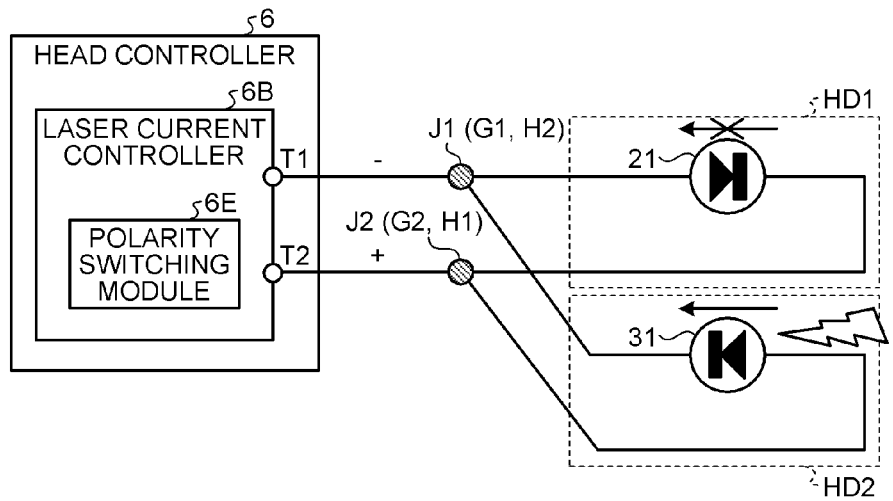
FIG. 5C is a diagram illustrating the polarity setting method of the laser current control unit 6B when the laser diode 31 illustrated in FIG. 5A is selected.

Next, a method of connecting the magnetic heads HD1 and HD2 and the head control unit 6 will be described with reference to FIGS. 5A to 5C. FIG. 5A is a diagram illustrating a method of connecting the laser diodes 21 and 31 which are provided in the magnetic heads HD1 and HD2 illustrated in FIG. 1, respectively. FIG. 5B is a diagram illustrating a polarity setting method of the laser current control unit 6B when the laser diode 21 illustrated in FIG. 5A is selected. FIG. 5C is a diagram illustrating the polarity setting method of the laser current control unit 6B when the laser diode 31 illustrated in FIG. 5A is selected.

In FIG. 5A, the laser diodes 21 and 31 are provided in the magnetic heads HD1 and HD2, respectively. In addition, current terminals T1 and T2 are provided in the laser current control unit 6B. The anode (positive electrode) of the laser diode 21 is connected to the terminal G1 and the cathode (negative electrode) of the laser diode 21 is connected to the terminal H1. The anode (positive electrode) of the laser diode 31 is connected to the terminal G2 and the cathode (negative electrode) of the laser diode 31 is connected to the terminal H2. The terminals G1 and H2 are bonded to each other to form the bonding portion J1 and the terminals G2 and H1 are bonded to each other to form the bonding portion J2. In this way, the laser diodes 21 and 31 are connected in parallel to each other such that they have opposite polarities. The bonding portion J1 is connected to the current terminal T1 and the bonding portion J2 is connected to the current terminal T2.

When thermally-assisted magnetic recording is performed on the disk surface M1 corresponding to the magnetic head HD1, the polarity switching unit 6E sets the state of the current terminals T1 and T2 such that a current flows from the current terminal T1 to the current terminal T2, as illustrated in FIG. 5B. At that time, the current flows to the laser diode 21 provided in the magnetic head HD1 and laser light is emitted from the laser diode 21. Therefore, the disk surface M1 is locally heated.

The current of the writing element 25 is controlled by the write current control unit 6C and the magnetic field generated from the writing element 25 is controlled. The magnetic field generated by the writing element 25 approaches the locally heated region of the disk surface M1. Then, the magnetization state of the heated region is changed and thermally-assisted magnetic recording is performed on the disk surface M1.

As such, when the state of the current terminals T1 and T2 is set such that the current flows from the current terminal T1 to the current terminal T2, no current flows to the laser diode 31 and no laser light is emitted from the laser diode 31. Therefore, the disk surface M2 is not locally heated.

When thermally-assisted magnetic recording is performed on the disk surface M2 corresponding to the magnetic head HD2, the state of the current terminals T1 and T2 is set such that the current flows from the current terminal T2 to the current terminal T1, as illustrated in FIG. 5C. At that time, the current flows to the laser diode 31 provided in the magnetic head HD2 and laser light is emitted from the laser diode 31. Therefore, the disk surface M2 is locally heated.

As such, when the state of the current terminals T1 and T2 is set such that the current flows from the current terminal T2 to the current terminal T1, no current flows to the laser diode 21 and no laser light is emitted from the laser diode 21. Therefore, the disk surface M1 is not locally heated.

That is, as described above, even when the laser diodes 21 and 31 are connected in parallel to each other so as to have opposite polarities and the current terminals T1 and T2 are shared by the laser diodes 21 and 31, the current can flow only one of the laser diodes 21 and 31. According to this embodiment, the terminal G1 is arranged on the terminal H2 so as to overlap the terminal H2 and the terminal H1 is arranged on the terminal G2 so as to overlap the terminal G2. Therefore, it is possible to reduce the space of the bonding portions of the wiring lines connected to the elements which are provided in the magnetic heads HD1 and HD2.

(Second Embodiment)

Figure 6:
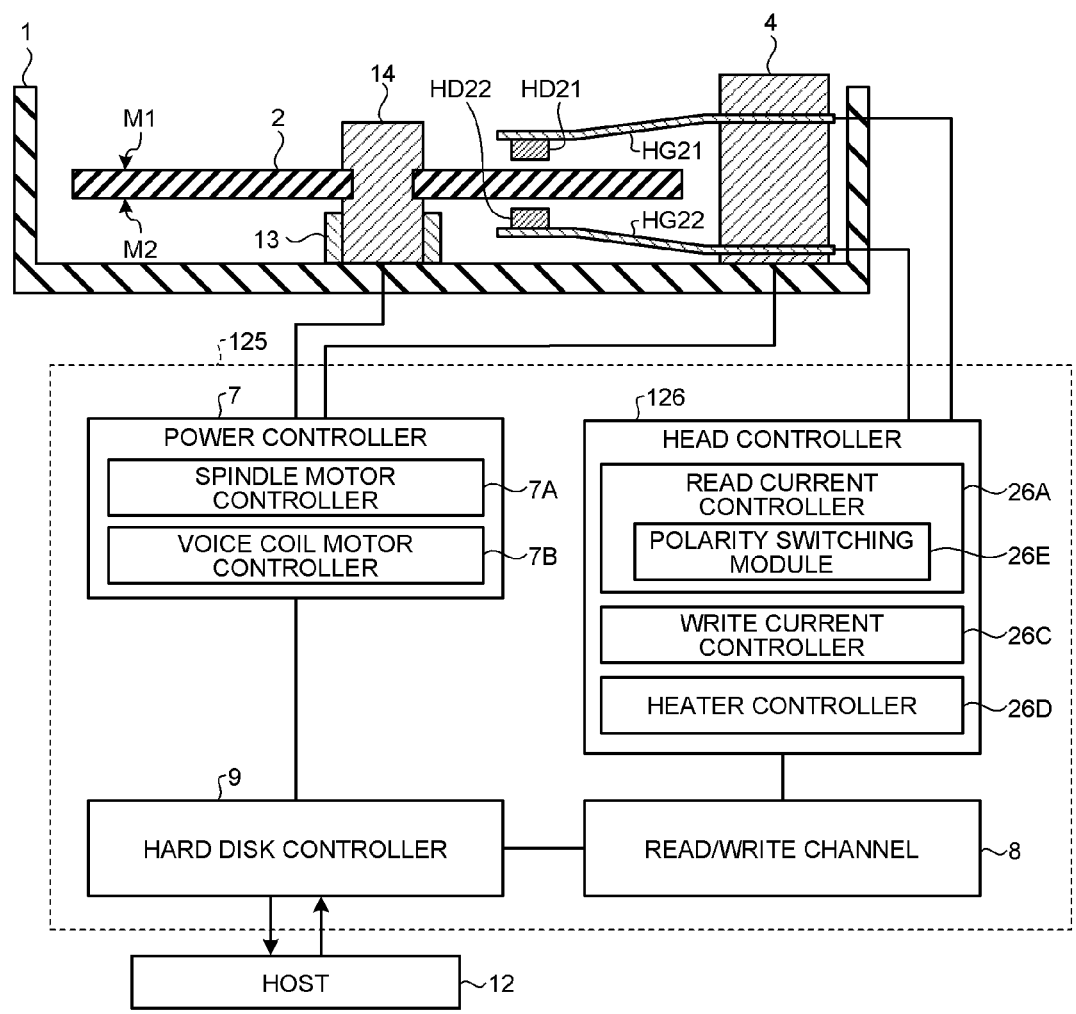
FIG. 6 is a block diagram illustrating the schematic structure of a magnetic disk device according to a second embodiment.

FIG. 6 is a block diagram illustrating the schematic structure of a magnetic disk device according to a second embodiment.

In FIG. 6, the magnetic disk device includes head gimbal assemblies HG21 and HG22, instead of the head gimbal assemblies HG1 and HG2 illustrated in FIG. 1. The head gimbal assemblies HG21 and HG22 include magnetic heads HD21 and HD22, respectively.

Figure 7:
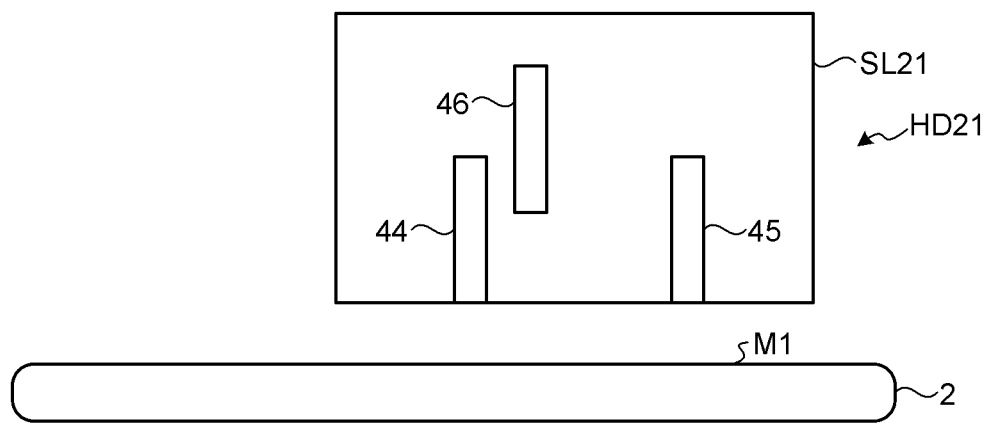
FIG. 7 is a block diagram illustrating the schematic structure of a magnetic head HD21 illustrated in FIG. 6.

FIG. 7 is a block diagram illustrating the schematic structure of the magnetic head HD21 illustrated in FIG. 6.

In FIG. 7, the magnetic head HD21 includes a reading element 44, a writing element 45, and a heater element 46 and is supported on a slider SL21. The reading element 44 and the writing element 45 are arranged so as to face a disk surface M1. The magnetic field generated by the writing element 45 is applied to the disk surface M1. Then, the magnetization state of the disk surface M is changed and magnetic recording is performed. At that time, the slider SL21 is heated by the heater element 46 and the expansion of the slider SL21 is controlled to control the distance between the slider SL21 and the disk surface M1. The magnetic head HD22 may also have the same structure as the magnetic head HD21.

Figure 8A:
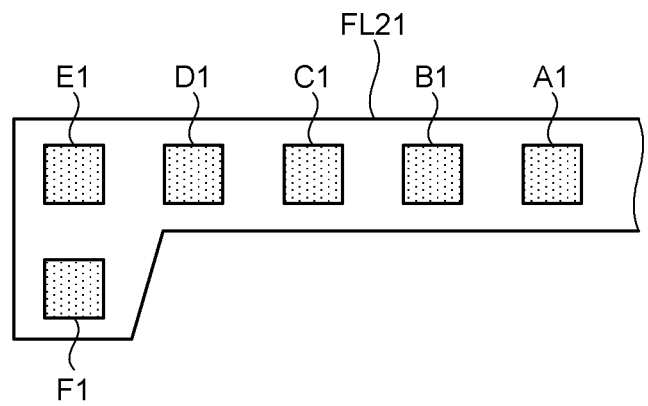
FIG. 8A is a plan view illustrating the structure of a terminal portion of a flexure FL21 provided in a head gimbal assembly HG21 illustrated in FIG. 6.
Figure 8B:
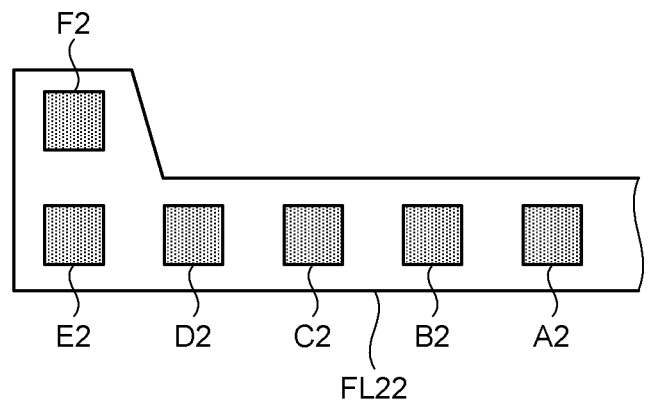
FIG. 8B is a plan view illustrating the structure of a terminal portion of a flexure FL22 provided in a head gimbal assembly HG22 illustrated in FIG. 6.
Figure 8C:
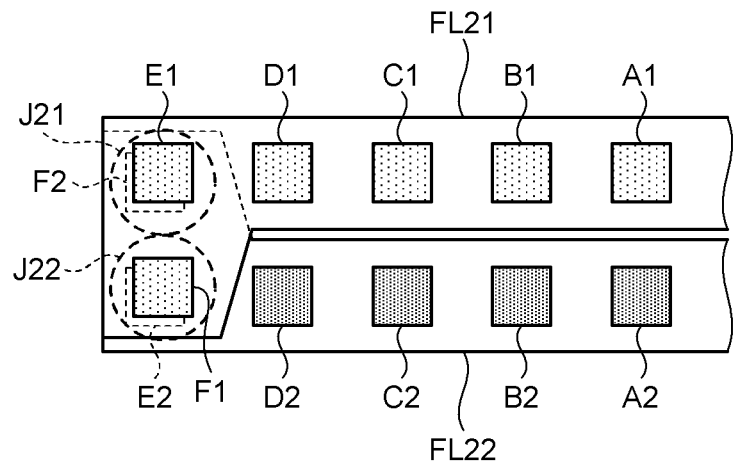
FIG. 8C is a plan view illustrating a method of mounting the terminal portions of the flexures FL21 and FL22 illustrated in FIGS. 8A and 8B.

FIG. 8A is a plan view illustrating the structure of a terminal portion of a flexure FL21 which is provided in the head gimbal assembly HG21 illustrated in FIG. 6. FIG. 8B is a plan view illustrating the structure of a terminal portion of a flexure FL22 which is provided in the head gimbal assembly HG22 illustrated in FIG. 6. FIG. 8C is a plan view illustrating a method of mounting the terminal portions of the flexures FL21 and FL22 illustrated in FIGS. 8A and 8B.

In FIG. 8A, the head gimbal assemblies HG21 and HG22 include the flexures FL21 and FL22 for drawing wiring lines connected to the magnetic heads HD21 and HD22, respectively. The leading ends of the flexures FL21 and FL22 are connected to the magnetic heads HD21 and HD22, respectively, and terminals A1 to F1 and terminals A2 to F2 are provided at the rear ends of the flexures FL21 and FL22, respectively.

The terminals A1 and B1 can be allocated to two terminals of the writing element 45 of the magnetic head HD21. The terminals C1 and D1 can be allocated to two terminals of the heater element 46 of the magnetic head HD21. The terminals E1 and F1 can be allocated to two terminals of the reading element 44 of the magnetic head HD21. The terminals A2 and B2 can be allocated to two terminals of the writing element of the magnetic head HD22. The terminals C2 and D2 can be allocated to two terminals of the heater element of the magnetic head HD22. The terminals E2 and F2 can be allocated to two terminals of the reading element of the magnetic head HD22.

As illustrated in FIG. 8A, a region of the flexure FL21 in which the terminal F1 is arranged is bent toward the flexure FL22 in an L-shape. The terminals A1 to E1 are arranged in a line on the flexure FL21 and the terminal F1 is arranged in the bent portion of the flexure FL21 so as to be adjacent to the terminal E1. As illustrated in FIG. 8B, a portion of the flexure FL22 in which the terminal F2 is arranged is bent toward the flexure FL21 in an L-shape. The terminals A2 to E2 are arranged in a line on the flexure FL22 and the terminal F2 is arranged in the bent portion of the flexure FL22 so as to be adjacent to the terminal E2.

The rear ends of the flexures FL21 and FL22 are bent by 90° so as to be arranged on the side surfaces of the head gimbal assemblies HG21 and HG22. According to this structure, as illustrated in FIG. 8C, the terminals A1 to D1 and the terminals A2 to D2 are arranged in parallel to each other on the side surfaces of the head gimbal assemblies HG21 and HG22. In addition, the terminal E1 is arranged on the terminal F2 so as to overlap the terminal F2 and the terminal F1 is arranged on the terminal E2 so as to overlap the terminal E2. The terminals E1 and F2 are bonded to each other to form a bonding portion J21 and the terminals E2 and F1 are bonded to each other to form a bonding portion J22.

The terminal E1 is arranged on the terminal F2 so as to overlap the terminal F2 and the terminal F1 is arranged on the terminal E2 so as to overlap the terminal F1. Therefore, the space of the flexures FL21 and FL22 is reduced by a value corresponding to the terminals F1 and F2.

The magnetic disk device illustrated in FIG. 6 includes a magnetic recording control unit 125 instead of the magnetic recording control unit 5 and the magnetic recording control unit 125 includes a head control unit 126 instead of the head control unit 6. The head control unit 126 includes a read current control unit 26A, a write current control unit 26C, and a heater control unit 26D. The read current control unit 26A includes a polarity switching unit 26E.

The head control unit 126 can amplify or detect a signal during recording or reproduction. The read current control unit 26A can control the read currents of the magnetic heads HD21 and HD22. For example, the read current control unit 26A controls a current flowing to the reading element 44 in the magnetic head HD21. The write current control unit 26C can control the write currents of the magnetic heads HD21 and HD22. For example, the write current control unit 26C controls a current flowing to the writing element 45 in the magnetic head HD21. The heater control unit 26D can control the heater currents of the magnetic heads HD21 and HD22. For example, the heater control unit 26D controls a current flowing to the heater element 46 in the magnetic head HD21. The polarity switching unit 26E can switch the polarity of the current output from the read current control unit 26A.

Figure 9A:
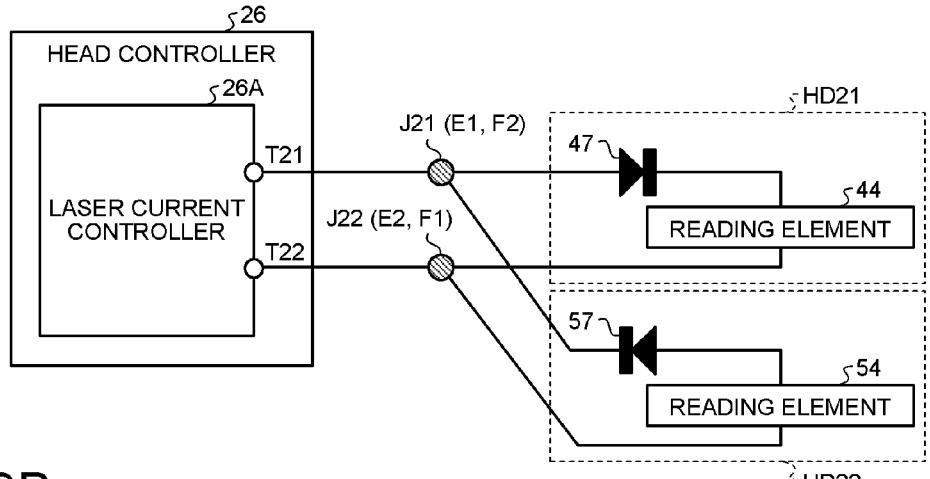
FIG. 9A is a diagram illustrating a method of connecting reading elements 44 and 54 which are provided in the magnetic heads HD21 and HD22 illustrated in FIG. 6, respectively.
Figure 9B:
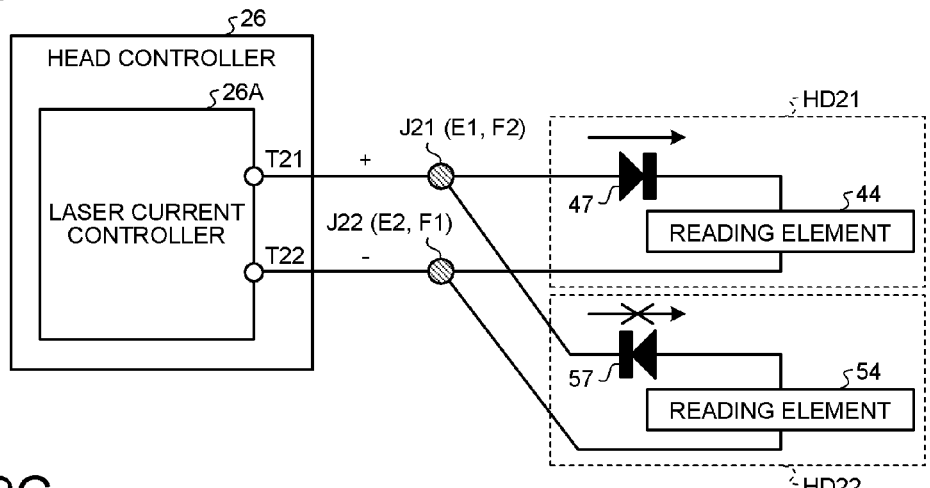
FIG. 9B is a diagram illustrating a polarity setting method of a read current control unit 26A when the reading element 44 illustrated in FIG. 9A is selected.
Figure 9C:
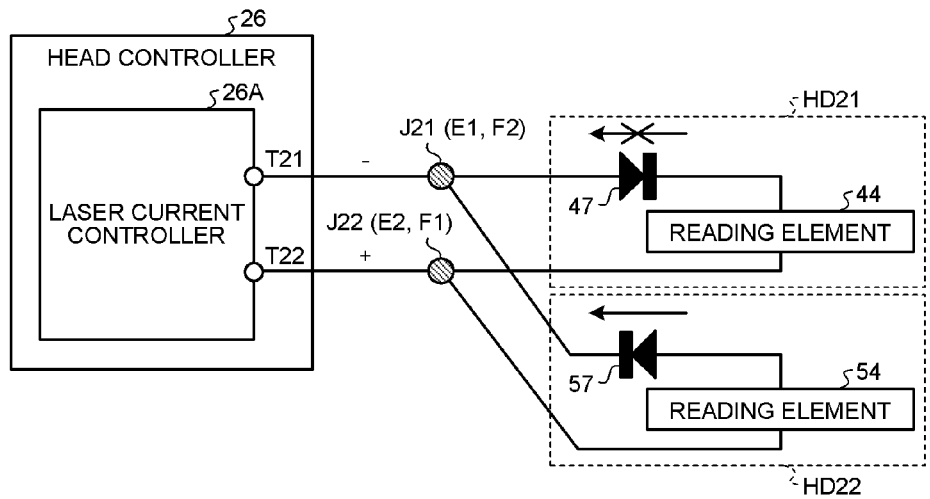
FIG. 9C is a diagram illustrating the polarity setting method of the read current control unit 26A when the reading element 54 illustrated in FIG. 9A is selected.

Next, a method of connecting the magnetic heads HD21 and HD22 and the head control unit 126 will be described with reference to FIGS. 9A to 9C. FIG. 9A is a diagram illustrating a method of connecting the reading elements 44 and 54 which are provided in the magnetic heads HD21 and HD22 illustrated in FIG. 6, respectively. FIG. 9B is a diagram illustrating a polarity setting method of the read current control unit 26A when the reading element 44 illustrated in FIG. 9A is selected. FIG. 9C is a diagram illustrating the polarity setting method of the read current control unit 26A when the reading element 54 illustrated in FIG. 9A is selected.

In FIG. 9A, the reading elements 44 and 54 are provided in the magnetic heads HD21 and HD22, respectively. Diodes 47 and 57 are connected in series to the reading elements 44 and 54, respectively. Current terminals T21 and T22 are provided in the read current control unit 26A. The anode side (positive electrode) of the diode 47 is connected to the terminal E1 and the cathode (negative electrode) of the diode 47 is connected to the terminal F1 through the reading element 44. The anode side (positive electrode) of the diode 57 is connected to the terminal E2 through the reading element 54 and the cathode (negative electrode) of the diode 57 is connected to the terminal F2. The terminals E1 and F2 are bonded to each other to form the bonding portion J21 and the terminals E2 and F1 are bonded to each other to form the bonding portion J22. Therefore, a two-terminal element in which the diode 47 is connected in series to the reading element 44 and a two-terminal element in which the diode 57 is connected in series to the reading element 54 are connected in parallel so as to have opposite polarities. The bonding portion J21 is connected to the current terminal T21 and the bonding portion J22 is connected to the current terminal T22.

When information is read from the disk surface M1 corresponding to the magnetic head HD21, the state of the current terminals T1 and T2 is set such that the current flows from the current terminal T21 to the current terminal T22, as illustrated in FIG. 9B. At that time, the current flows to the reading element 44 provided in the magnetic head HD21. A signal is read from the magnetic disk 2 through the reading element 44 while the magnetic disk 2 is being rotated by the spindle motor 13 and is detected by the head control unit 126. The signal detected by the head control unit 126 is converted into data by a read/write channel 8 and is then transmitted to a hard disk control unit 9.

As such, when the state of the current terminals T1 and T2 is set such that the current flows from the current terminal T21 to the current terminal T22, no current flows to the reading element 54 and no signal is read from the magnetic disk 2 through the reading element 54.

When information is read from the disk surface M2 corresponding to the magnetic head HD22, the state of the current terminals T1 and T2 is set such that the current flows from the current terminal T22 to the current terminal T21, as illustrated in FIG. 9C. At that time, the current flows to the reading element 54 provided in the magnetic head HD22 and a signal is read from the magnetic disk 2 through the reading element 54.

As such, when the state of the current terminals T1 and T2 is set such that the current flows from the current terminal T22 to the current terminal T21, no current flows to the reading element 44 and no signal is read from the magnetic disk 2 through the reading element 44.

That is, as described above, the diodes 47 and 57 are connected in series to the reading elements 44 and 54, respectively, and the two-terminal element in which the diode 47 is connected in series to the reading element 44 and the two-terminal element in which the diode 57 is connected in series to the reading element 54 are connected in parallel to each other so as to have opposite polarities. Therefore, even when the current terminals T21 and T22 are shared by the reading elements 44 and 54, a current can flow to only one of the reading elements 44 and 54. According to this embodiment, the terminal E1 is arranged on the terminal F2 so as to overlap the terminal F2 and the terminal F1 is arranged on the terminal E2 so as to overlap the terminal E2. Therefore, it is possible to reduce the space of the bonding portions of the wiring lines connected to the elements which are provided in the magnetic heads HD21 and HD22.

(Third Embodiment)

Figure 10:
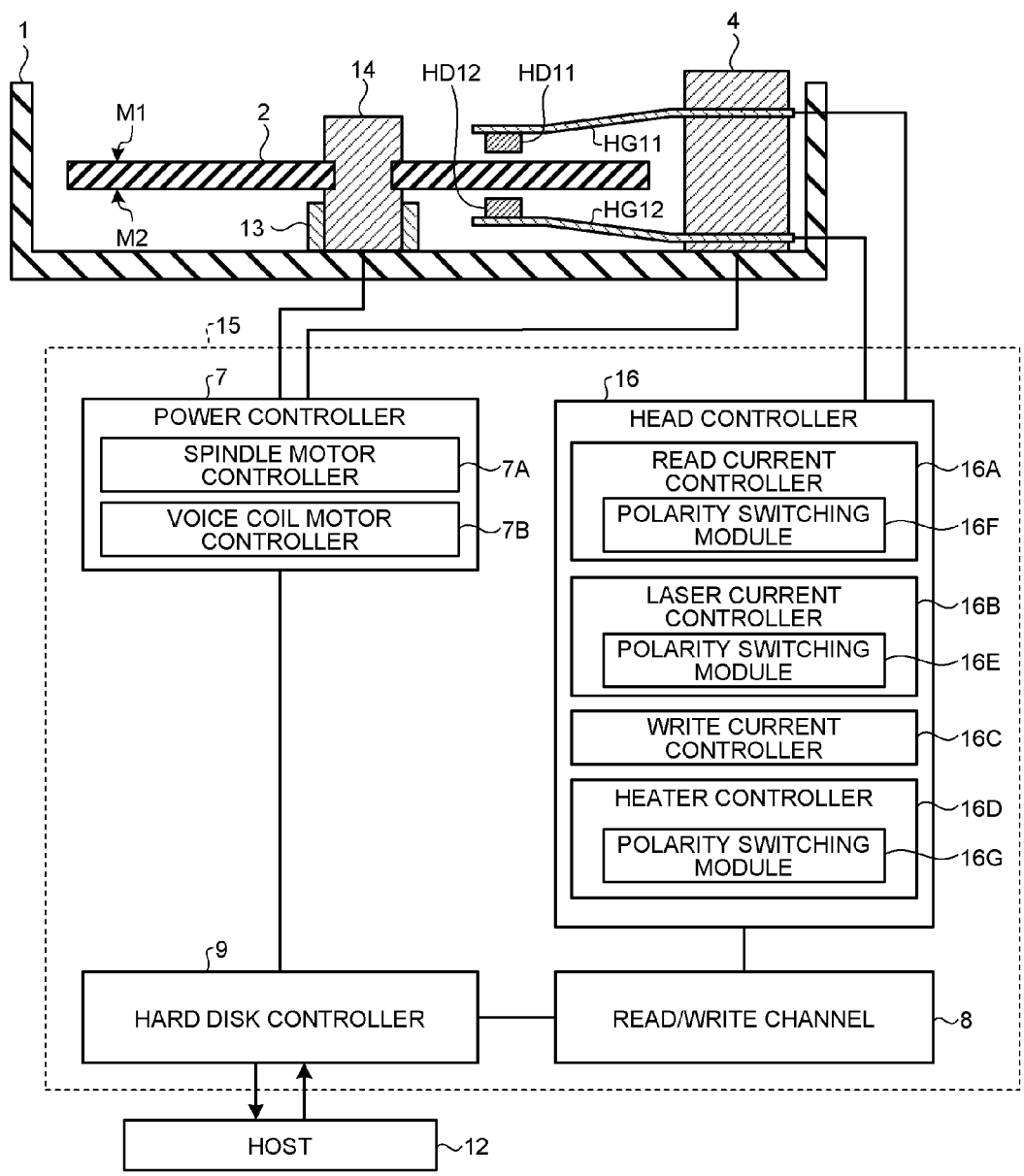
FIG. 10 is a block diagram illustrating the schematic structure of a magnetic disk device according to a third embodiment.

FIG. 10 is a block diagram illustrating the schematic structure of a magnetic disk device according to a third embodiment.

In FIG. 10, the magnetic disk device includes head gimbal assemblies HG11 and HG12 instead of the head gimbal assemblies HG1 and HG2 illustrated in FIG. 1 and each of the head gimbal assemblies HG11 and HG12 includes magnetic heads HD11 and HD12, respectively.

Figure 12A:
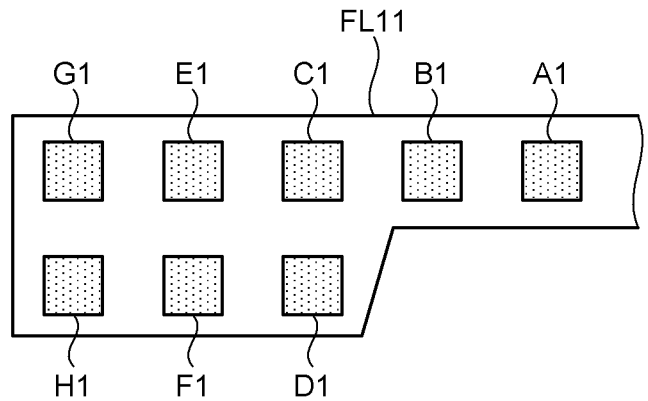
FIG. 12A is a plan view illustrating the structure of a terminal portion of a flexure FL11 illustrated in FIG. 11A.
Figure 12B:
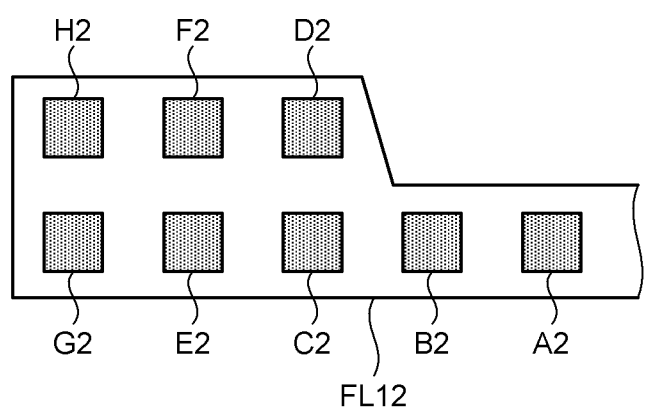
FIG. 12B is a plan view illustrating the structure of a terminal portion of a flexure FL12 illustrated in FIG. 11A.
Figure 12C:
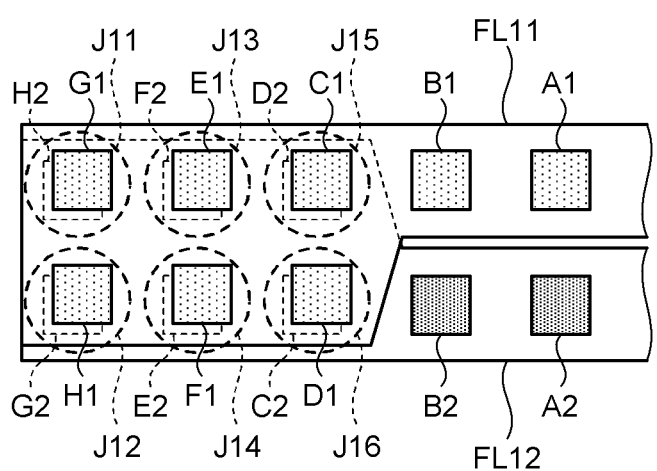
FIG. 12C is a plan view illustrating a method of mounting the terminal portions of the flexures FL11 and FL12 illustrated in FIGS. 12A and 12B.

FIG. 11A is a perspective view illustrating the schematic structure of a head stack assembly HS2 including the magnetic heads HD11 and HD12 illustrated in FIG. 10. FIG. 11B is a perspective view illustrating the schematic structure of a circuit board provided in the head stack assembly HS2 illustrated in FIG. 11A. FIG. 12A is a plan view illustrating the structure of a terminal portion of a flexure FL11 illustrated in FIG. 11A. FIG. 12B is a plan view illustrating the structure of a terminal portion of a flexure FL12 illustrated in FIG. 11A. FIG. 12C is a plan view illustrating a method of mounting the terminal portions of the flexures FL11 and FL12 illustrated in FIGS. 12A and 12B.

In FIG. 11A, suspensions SP1 and SP2 are provided at the leading ends of the head gimbal assemblies HG11 and HG12 and the magnetic heads HD11 and HD12 are arranged at the leading ends of the suspensions SP1 and SP2, respectively. The suspensions SP1 and SP2 are supported by arms AM1 and AM2, respectively, and the arms AM1 and AM2 are supported by a bearing unit JP such that they can be rotated in the horizontal planes to disk surfaces M1 and M2 of a magnetic disk 2. The head gimbal assemblies HG11 and HG12 are laminated to form the head stack assembly HS2.

The head gimbal assemblies HG11 and HG12 include the flexures FL11 and FL12 for drawing wiring lines connected to the magnetic heads HD11 and HD12, respectively. The leading ends of the flexures FL11 and FL12 are connected to the magnetic heads HD11 and HD12, respectively, and terminals A1 to H1 and terminals A2 to H2 are provided at the rear ends of the flexures FL11 and FL12, respectively.

As illustrated in FIG. 12A, the width of a region of the flexure FL11 in which the terminals C1 to H1 are arranged is more than that of a region in which the terminals A1 and B1 are arranged. The terminals A1 to C1, E1, and G1 are arranged in a line on the flexure FL1 and the terminals D1, F1, and H1 are arranged in parallel to the terminals C1, E1, and G1. As illustrated in FIG. 12B, the width of a region of the flexure FL12 in which the terminals C2 to H2 are arranged is more than that of a region in which the terminals A2 and B2 are arranged. The terminals A2 to C2, E2, and G2 are arranged in a line on the flexure FL12 and the terminals D2, F2, and H2 are arranged in parallel to the terminals C2, E2, and G2.

As illustrated in FIG. 11A, the flexures FL11 and FL12 are arranged along the opposite surfaces of the suspensions SP1 and SP2 and the opposite surfaces of the arms AM1 and AM2. The rear ends of the flexures FL11 and FL12 are bent by 90° so as to be arranged on the side surfaces of the head gimbal assemblies HG11 and HG12. According to this structure, as illustrated in FIG. 12C, the terminals A1 to C1, E1, and G1 and the terminals A2 to C2, E2, and G2 are arranged in parallel to each other on the side surfaces of the head gimbal assemblies HG11 and HG12. In addition, the terminal D1 is arranged on the terminal C2 so as to overlap the terminal C2 and the terminal C1 is arranged on the terminal D2 so as to overlap the terminal D2. The terminal F1 is arranged on the terminal E2 so as to overlap the terminal E2 and the terminal E1 is arranged on the terminal F2 so as to overlap the terminal F2. The terminal H1 is arranged on the terminal G2 so as to overlap the terminal G2 and the terminal G1 is arranged on the terminal H2 so as to overlap the terminal H2. The terminals C1 and D2 are bonded to each other to form a bonding portion J15 and the terminals D1 and C2 are bonded to each other to form a bonding portion J16. The terminals E1 and F2 are bonded to each other to form a bonding portion J13 and the terminals F1 and E2 are bonded to each other to form a bonding portion J14. The terminals G1 and H2 are bonded to each other to form a bonding portion J11 and the terminals H1 and G2 are bonded to each other to form a bonding portion J12.

The terminals A5 to E5, the terminals A6 to E6, and the wiring lines HA11 and HA12 are formed on a circuit board SB2 and an IC chip CP2 is mounted on the circuit board SB2. The terminals A5 to E5 are connected to the IC chip CP2 through the wiring line HA11 and the terminals A6 to E6 are connected to the IC chip CP2 through the wiring line HA12.

Since the circuit board SB2 is mounted on the rear ends of the flexures FL11 and FL12, the terminals A5 and B5 are bonded to the terminals A1 and B1, respectively, and the terminals A6 and B6 are bonded to the terminals A2 and B2, respectively. The terminal C5 is bonded to the bonding portion J15 and is electrically connected to the terminals C1 and D2. The terminal D5 is bonded to the bonding portion J13 and is electrically connected to the terminals E1 and F2. The terminal E5 is bonded to the bonding portion J11 and is electrically connected to the terminals G1 and H2. The terminal C6 is bonded to the bonding portion J16 and is electrically connected to the terminals D1 and C2. The terminal D6 is bonded to the bonding portion J14 and is electrically connected to the terminals F1 and E2. The terminal E6 is bonded to the bonding portion J12 and is electrically connected to the terminals H1 and G2.

The terminal D1 is arranged on the terminal C2 so as to overlap the terminal C2. The terminal C1 is arranged on the terminal D2 so as to overlap the terminal D2. The terminal F1 is arranged on the terminal E2 so as to overlap the terminal E2. The terminal E1 is arranged on the terminal F2 so as to overlap the terminal F2. The terminal H1 is arranged on the terminal G2 so as to overlap the terminal G2. The terminal G1 is arranged on the terminal H2 so as to overlap the terminal H2. In this way, it is possible to reduce the spaces of the flexures FL11 and FL12 and the circuit board SB2 by a value corresponding to the terminals C1 to H1. The terminals C1 and D2 are bonded to each other. The terminals D1 and C2 are bonded to each other. The terminals E1 and F2 are bonded to each other. The terminals F1 and E2 are bonded to each other. The terminals G1 and H2 are bonded to each other. The terminals H1 and G2 are bonded to each other. In this way, it is possible to reduce the number of terminals of the IC chip CP2 and thus reduce the size of the IC chip CP2.

The magnetic disk device illustrated in FIG. 10 includes a magnetic recording control unit 15 instead of the magnetic recording control unit 5. The magnetic recording control unit 15 includes a head control unit 16 instead of the head control unit 6. The head control unit 16 includes a read current control unit 16A, a laser current control unit 16B, a write current control unit 16C, and a heater control unit 16D. The laser current control unit 16B includes a polarity switching unit 16E. The read current control unit 16A includes a polarity switching unit 16F. The heater control unit 16D includes a polarity switching unit 16G.

The head control unit 16 can amplify or detect a signal during recording or reproduction. The read current control unit 16A can control the read current of the magnetic heads HD11 and HD12. The laser current control unit 16B can control the laser current of the magnetic heads HD11 and HD12. The write current control unit 16C can control the write current of the magnetic heads HD11 and HD12. The heater control unit 16D can control the heater current of the magnetic heads HD11 and HD12. The polarity switching unit 16E can switch the polarity of the current output from the laser current control unit 16B. The polarity switching unit 16F can switch the polarity of the current output from the read current control unit 16A. The polarity switching unit 16G can switch the polarity of the current output from the heater control unit 16D.

Figure 13:
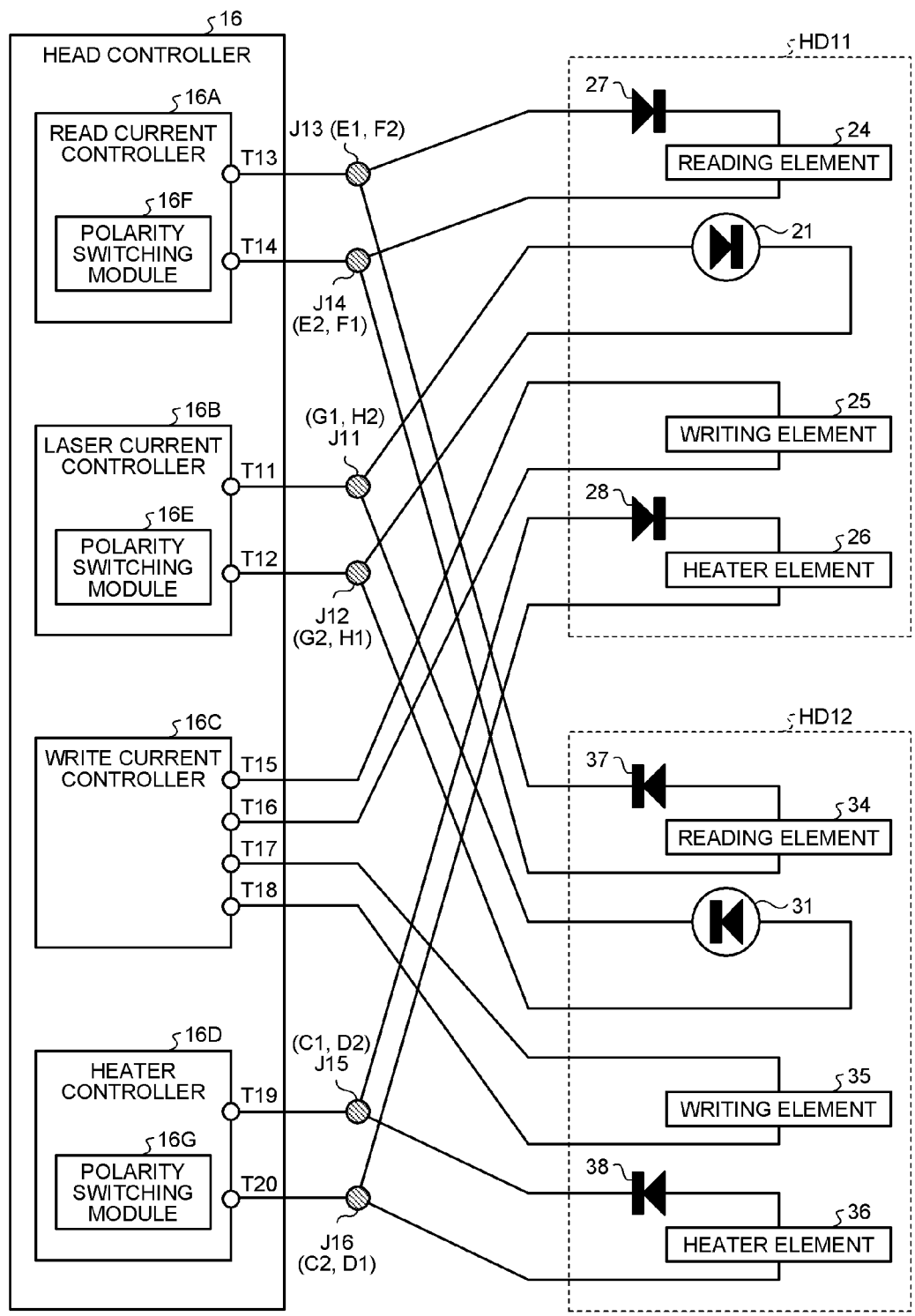
FIG. 13 is a diagram illustrating a method of connecting laser diodes 21 and 31, reading elements 24 and 34, writing elements 25 and 35, and heater elements 26 and 36 which are provided in the magnetic heads HD11 and HD12 illustrated in FIG. 10, respectively.

Next, a method of connecting the magnetic heads HD11 and HD12 and the head control unit 16 will be described with reference to FIG. 13. FIG. 13 is a diagram illustrating a method of connecting the laser diodes 21 and 31, the reading elements 24 and 34, the writing elements 25 and 35, and heater elements 26 and 36 which are respectively provided in the magnetic heads HD11 and HD12 illustrated in FIG. 10.

In FIG. 13, the magnetic heads HD11 and HD12 include the laser diodes 21 and 31, the reading elements 24 and 34, the writing elements 25 and 35, and the heater elements 26 and 36, respectively. Diodes 27 and 37 are connected in series to the reading elements 24 and 34, respectively. Diodes 28 and 38 are connected in series to the heater elements 26 and 36, respectively.

The read current control unit 16A includes current terminals T13 and T14 and the laser current control unit 16B includes current terminals T11 and T12. The write current control unit 16C includes current terminals T15 to T18 and the heater control unit 16D includes current terminals T19 and T20.

The anode (positive electrode) of the laser diode 21 is connected to the terminal G1 and the cathode (negative electrode) of the laser diode 21 is connected to the terminal H1. The anode (positive electrode) of the laser diode 31 is connected to the terminal G2 and the cathode (negative electrode) of the laser diode 31 is connected to the terminal H2. The anode (positive electrode) of the diode 27 is connected to the terminal E1 and the cathode (negative electrode) of the diode 27 is connected to the terminal F1 through the reading element 24. The anode (positive electrode) of the diode 37 is connected to the terminal E2 through the reading element 34 and the cathode (negative electrode) of the diode 37 is connected to the terminal F2. The anode (positive electrode) of the diode 28 is connected to the terminal C1 and the cathode (negative electrode) of the diode 28 is connected to the terminal D1 through the heater element 26. The anode (positive electrode) of the diode 38 is connected to the terminal C2 through the heater element 36 and the cathode (negative electrode) of the diode 38 is connected to the terminal D2. One end of the writing element 25 is connected to the terminal A1 and the other end of the writing element 25 is connected to the terminal B1. One end of the writing element 35 is connected to the terminal A2 and the other end of the writing element 35 is connected to the terminal B2.

The bonding portion J11 is connected to the current terminal T11 and the bonding portion J12 is connected to the current terminal T12. The bonding portion J13 is connected to the current terminal T13 and the bonding portion J14 is connected to the current terminal T14. The bonding portion J15 is connected to the current terminal T19 and the bonding portion J16 is connected to the current terminal T20. The terminal A1 is connected to the current terminal T15. The terminal B1 is connected to the current terminal T16. The terminal A2 is connected to the current terminal T17. The terminal B2 is connected to the current terminal T18.

When thermally-assisted magnetic recording is performed on the disk surface M1 corresponding to the magnetic head HD11, the state of the current terminals T11 to T14, T19, and T20 is set such that the current flows from the current terminals T11, T13, and T19 to the current terminals T12, T14, and T20. At that time, the current flows to the laser diode 21 provided in the magnetic head HD11 and laser light is emitted from the laser diode 21. Therefore, the disk surface M1 is locally heated. The current also flows to the reading element 24 provided in the magnetic head HD11 and a signal is read through the reading element 24. In addition, the current also flows to the heater element 26 provided in the magnetic head HD11 and the slider of the magnetic head HD11 heated. Therefore, the distance between the magnetic head HD11 and the disk surface M1 is adjusted.

In the reading of information from the magnetic disk 2, a signal is read from the magnetic disk 2 through the reading element 24 while the magnetic disk 2 is being rotated by the spindle motor 13 and is detected by the head control unit 16. The signal detected by the head control unit 16 is converted into data by the read/write channel 8 and is then transmitted to the hard disk control unit 9. The hard disk control unit 9 performs tracking control for the magnetic head HD11 on the basis of a servo signal in the signal detected by the head control unit 16.

The write current control unit 16C controls the current of the writing element 25 to control the magnetic field generated by the writing element 25. The magnetic field generated by the writing element 25 is applied to a heated region of the disk surface M1. Then, the magnetization state of the heated region is changed and the thermally-assisted magnetic recording is performed on the disk surface M1.

As such, when the state of the current terminals T11 to T14, T19, and T20 is set such that the current flows from the current terminals T11, T13, and T19 to the current terminals T12, T14, and T20, no current flows to the laser diode 31 and no laser light is emitted from the laser diode 31. Therefore, the disk surface M2 is not locally heated. In addition, since no current flows to the reading element 34, no signal is read through the reading element 34. Since no current flows to the heater element 36, the slider of the magnetic head HD12 is not heated.

When the thermally-assisted magnetic recording is performed on the disk surface M2 corresponding to the magnetic head HD12, the state of the current terminals T11 to T14, T19, and T20 is set such that the current flows from the current terminals T12, T14, and T20 to the current terminals T11, T13, and T19. At that time, the current flows to the laser diode 31 provided in the magnetic head HD12 and laser light is emitted from the laser diode 31. Therefore, the disk surface M2 is locally heated. The current also flows to the reading element 34 of the magnetic head HD12 and a signal is read through the reading element 34. In addition, the current also flows to the heater element 36 provided in the magnetic head HD12 and the slider of the magnetic head HD12 is heated. Therefore, the distance between the magnetic head HD12 and the disk surface M2 is adjusted.

As such, when the state of the current terminals T11 to T14, T19, and T20 is set such that the current flows from the current terminals T12, T14, and T20 to the current terminals T11, T13, and T19, no current flows to the laser diode 21 and no laser light is emitted from the laser diode 21. Therefore, the disk surface M1 is not locally heated. Since no current flows to the reading element 24, no signal is read through the reading element 24. In addition, since no current flows to the heater element 26, the slider of the magnetic head HD11 is not heated. According to this embodiment, the terminal D1 is arranged on the terminal C2 so as to overlap the terminal C2. The terminal C1 is arranged on the terminal D2 so as to overlap the terminal D2. The terminal F1 is arranged on the terminal E2 so as to overlap the terminal E2. The terminal E1 is arranged on the terminal F2 so as to overlap the terminal F2. The terminal H1 is arranged on the terminal G2 so as to overlap the terminal G2. The terminal G1 is arranged on the terminal H2 so as to overlap the terminal H2. Therefore, it is possible to reduce the space of the bonding portions of the wiring lines connected to the elements which are provided in the magnetic heads HD11 and HD12.

In the embodiment illustrated in FIG. 13, the terminals of the laser diodes 21 and 31, the terminals of the reading elements 24 and 34, and the terminals of the heater elements 26 and 36 are shared between the head gimbal assemblies HG11 and HG12. However, the terminals of one pair of two-terminal elements among the laser diodes 21 and 31, the reading elements 24 and 34, and the heater elements 26 and 36 may be shared between the head gimbal assemblies HG11 and HG12. Alternatively, the terminals of two pairs of two-terminal elements among the laser diodes 21 and 31, the reading elements 24 and 34, and the heater elements 26 and 36 may be shared between the head gimbal assemblies HG11 and HG12. In the above-described embodiment, the terminals of the laser diodes 21 and 31, the terminals of the reading elements 24 and 34, and the terminals of the heater elements 26 and 36 are shared between the head gimbal assemblies HG11 and HG12. However, when a two-terminal element, such as a touch sensor, is provided in the magnetic head, the two-terminal elements may be shared between the head gimbal assemblies HG11 and HG12.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk including a first disk surface and a second disk surface;
   a first magnetic head that is used to record or reproduce data on or from the first disk surface and includes a first two-terminal element including a first positive terminal and a first negative terminal;
   a second magnetic head that is used to record or reproduce data on or from the second disk surface and includes a second two-terminal element including a second positive terminal and a second negative terminal; and
   a current control unit that includes a first current terminal which is commonly connected to the first positive terminal and the second negative terminal and a second current terminal which is commonly connected to the first negative terminal and the second positive terminal and can switch a current polarity between the first current terminal and the second current terminal.

2. The magnetic disk device according to claim 1, further comprising:
   a first flexure that includes a first terminal connected to the first positive terminal and a second terminal connected to the first negative terminal; and
   a second flexure that includes a third terminal connected to the second positive terminal and a fourth terminal connected to the second negative terminal,
   wherein the first terminal and the fourth terminal are bonded while overlapping each other and the second terminal and the third terminal are bonded while overlapping each other.

3. The magnetic disk device according to claim 2, further comprising:
   a circuit board that includes a fifth terminal which is bonded to a bonding portion between the first terminal and the fourth terminal and a sixth terminal which is bonded to a bonding portion between the second terminal and the third terminal; and
   an IC chip that is mounted on the circuit board and is connected to the fifth terminal and the sixth terminal.

4. The magnetic disk device according to claim 1,
   wherein the first two-terminal element includes a first laser diode and the second two-terminal element includes a second laser diode.

5. The magnetic disk device according to claim 1,
wherein the first two-terminal element includes a first reading element and a first diode that is connected in series to the first reading element, and
the second two-terminal element includes a second reading element and a second diode that is connected in series to the second reading element.

6. The magnetic disk device according to claim 1,
wherein the first two-terminal element includes a first heater element and a third diode that is connected in series to the first heater element, and
the second two-terminal element includes a second reading element and a fourth diode that is connected in series to the second heater element.

7. A method of controlling a magnetic head including a first magnetic head that is used to record or reproduce data on or from a first disk surface and is provided with a first two-terminal element including a first positive terminal and a first negative terminal and a second magnetic head that is used to record or reproduce data on or from a second disk surface and is provided with a second two-terminal element including a second positive terminal and a second negative terminal, the first positive terminal and the second negative terminal being connected to each other and the first negative terminal and the second positive terminal being connected to each other, comprising:
setting a current polarity such that the first positive terminal is positive and the first negative terminal is negative when the first two-terminal element is selected; and
setting the current polarity such that the first positive terminal is negative and the first negative terminal is positive when the second two-terminal element is selected.

8. The method of controlling the magnetic head according to claim 7,
wherein the magnetic head further includes:
a first flexure that includes a first terminal connected to the first positive terminal and a second terminal connected to the first negative terminal; and
a second flexure that includes a third terminal connected to the second positive terminal and a fourth terminal connected to the second negative terminal, and
the first terminal and the fourth terminal are bonded while overlapping each other and the second terminal and the third terminal are bonded while overlapping each other.

9. The method of controlling the magnetic head according to claim 8,
wherein the magnetic head further includes:
a circuit board that includes a fifth terminal which is bonded to a bonding portion between the first terminal and the fourth terminal and a sixth terminal which is bonded to a bonding portion between the second terminal and the third terminal; and
an IC chip that is mounted on the circuit board and is connected to the fifth terminal and the sixth terminal.

10. The method of controlling the magnetic head according to claim 7,
wherein the first two-terminal element includes a first laser diode and the second two-terminal element includes a second laser diode.

11. The method of controlling the magnetic head according to claim 7,
wherein the first two-terminal element includes a first reading element and a first diode that is connected in series to the first reading element, and
the second two-terminal element includes a second reading element and a second diode that is connected in series to the second reading element.

12. The method of controlling the magnetic head according to claim 7,
wherein the first two-terminal element includes a first heater element and a third diode that is connected in series to the first heater element, and
the second two-terminal element includes a second reading element and a fourth diode that is connected in series to the second heater element.

* * * * *